April 5, 1932. A. F. GIESE, JR 1,852,565
LUBRICATION AND PROTECTION FOR CLAY GUN SCREW DRIVES
Filed Sept. 24, 1931
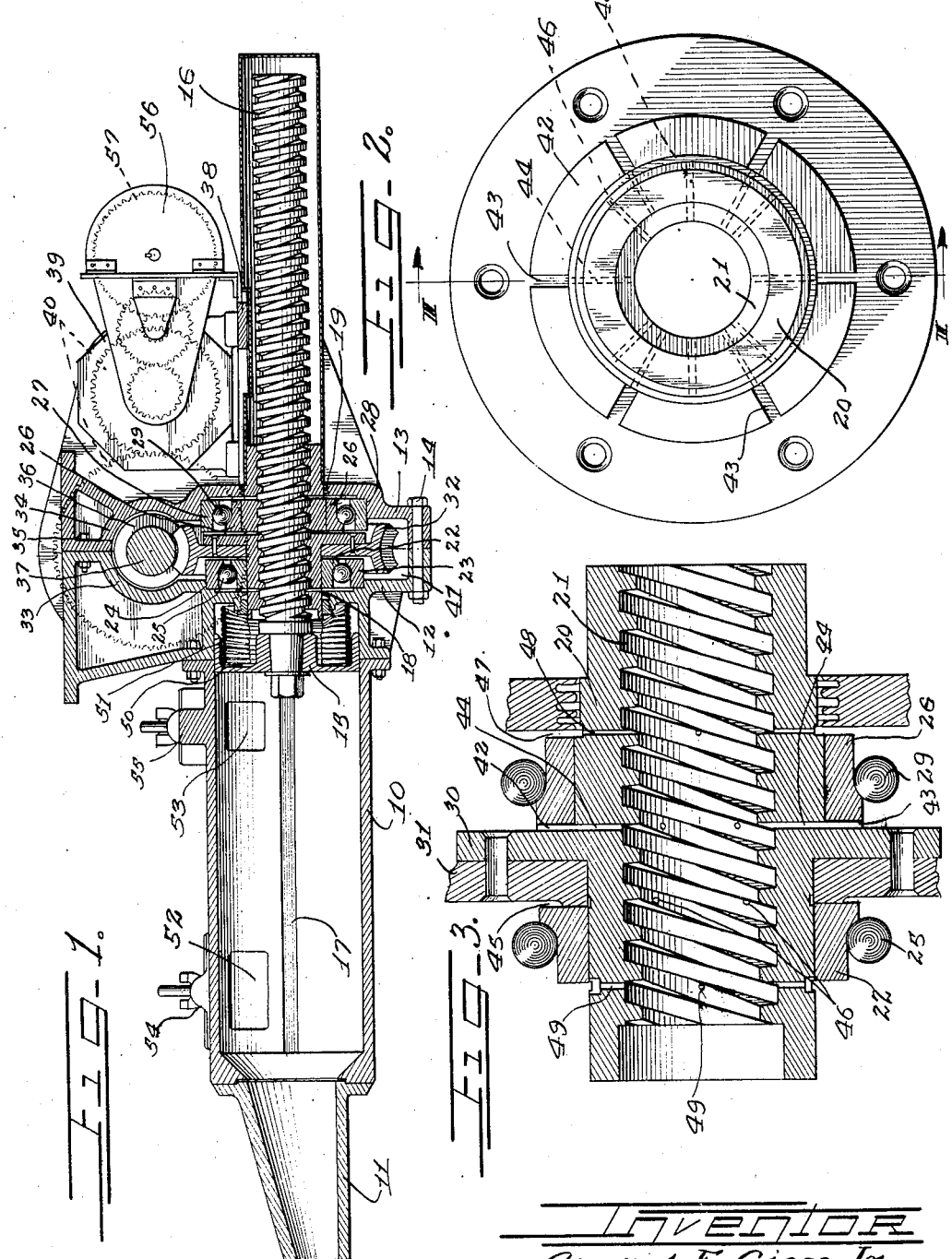
Inventor
August F. Giese, Jr.
by Charles T. Hill Attys.

Patented Apr. 5, 1932

1,852,565

UNITED STATES PATENT OFFICE

AUGUST F. GIESE, JR., OF GARY, INDIANA

LUBRICATION AND PROTECTION FOR CLAY GUN SCREW DRIVES

Application filed September 24, 1931. Serial No. 564,789.

My invention relates to clay guns of the type in which a screw drive is used for reciprocating the piston within the cylinder. The invention concerns particularly a driving arrangement in which a screw extends from and is rigidly secured to a piston and is prevented from rotating, with a nut engaging the screw and rotated to cause axial movement of the screw and shift of the piston through the cylinder, as for example, the arrangement disclosed in my co-pending application Serial No. 562,034, filed September 10, 1931.

In the type of drive arrangement referred to, provision must be made for adequate and continuous supply of lubricating oil to the bearing surfaces of the screw and the nut owing to the heavy pressure to which the screw is subjected when forcing the piston through the cylinder for the ejection of clay therefrom, and an important object of this invention is, therefore, to provide for such proper lubrication.

In the screw drive arrangement referred to, the screw, after having shifted the piston through the cylinder for the discharging of clay therefrom, will, unless protected, be exposed to the dropping thereon of clay particles from the sides of the cylinder, or clay which may have escaped between the piston and the cylinder walls. Another important object of the invention is, therefore, to provide a protecting housing for surrounding and protecting the screw when it is projected into the cylinder to shift the piston therein, such protecting housing or structure being preferably collapsible as the piston is drawn to the inner end of the cylinder and expansible as the piston is shifted to the outer end of the cylinder.

The features of my invention are incorporated in the structure disclosed on the drawings, in which drawings:

Figure 1 is a vertical diametral section of a clay gun showing the lubricating arrangement and the screw protecting structure;

Figure 2 is an enlarged end view of the screw propelling nut, and

Figure 3 is a section on plane III—III of Figure 2.

The gun structure comprises the cylinder 10 having at its outer end the discharge nozzle 11 and at its inner end, a head structure composed of inner and outer frames 12 and 13 detachably secured together by bolts 14. Reciprocable within the cylinder is the piston 15 to which a screw 16 is secured at its inner end and extends outwardly through the frames 12 and 13. The cylinder is shown as having side channels 17 on its interior through which extend lugs (not shown) on the sides of the piston, so that the piston and therefore the screw secured thereto are prevented from rotational movement relative to the cylinder. Within the frames 12 and 13 and extending through the openings 18 and 19 thereof is the drive nut 20 having the interior threading 21 receiving the threading of the screw 16. The nut receives at its inner end the inner member 22 of a ball bearing structure whose outer member 23 seats in the recess 24 formed in the frame 12, balls 25 being interposed between the members 22 and 23. At its outer end the nut receives the inner frame 26 of a ball bearing structure whose outer frame 27 seats in the recess 28 provided in the frame 13, the balls 29 being interposed between the bearing frame. Between the ball bearing structure, the nut has the flange 30 to which the web 31 of a worm wheel 32 is rigidly secured.

The frames 12 and 13 have extensions 33 and 34 on their upper sides, which form a cylindrical chamber 35 for a worm 36 which meshes with the worm wheel 32 and is supported on a shaft 37 journalled in the ends of the frame extensions 33 and 34.

A platform 38 extends from the frame 13 and supports an electric motor 39 connected by a suitable gearing train 40 with the worm shaft 37. Through this reduction gearing train, the worm, the worm wheel and the nut, the screw 16 is slowly and powerfully shifted axially when the motor 39 is operating for the powerful shifting movement of the piston within the cylinder. The resistance of the clay to movement of the piston causes heavy pressure between the driving nut and the screw and continuous and adequate lubrication must be provided for the bearing surface on the nut and screw.

The frames 12 and 13 provide an oil sump 41 into which the worm wheel 32 extends so that, as this wheel is rotated, it will carry oil upwardly, part of this oil which is carried upwardly thoroughly lubricating the bearing surfaces between the worm wheel and the worm and the rest of the oil flowing downwardly by gravity to be delivered through suitable ducts to the bearing surfaces of the nut 20 and the screw 16. As best shown in Figures 2 and 3, the nut flange 30 has the annular boss 42 which abuts the inner member 26 of the outer ball bearing structure; and radially through this boss, slots 43 are cut to communicate with holes 44 through the nut 20, the slots 43 and holes 44 being suitably circumferentially spaced, six slots and holes being shown. As the slots 43 travel through their upper position, part of the oil dropping down from the worm wheel 32 will flow through the slots and corresponding holes 44 to the bearing surfaces of the nut and screw.

The web of the worm wheel has the annular boss 45 which abuts the inner member 22 of the inner ball bearing structure and this boss may have slots similar to the slots 43 and communicating with holes 46 through the screw for the flow of oil.

Some of the oil dropping down from the top of the worm wheel also flows between the members of the outer ball bearing structure and into the clearance space 47 between the ball bearing structure and the frame 13, from which clearance space holes 48 extend through the nut for delivering oil to the nut and screw bearing surfaces. Similar holes 49 conduct the oil from the clearance space between the inner ball bearing structure and the frame 12. The various holes through the screw may be suitably relatively spaced so that there will always be a number of holes at the upper part of the screw for receiving the oil flowing down from the top of the worm wheel and delivering it to the bearing surface of the nut and screw, in order that these bearing surfaces may be at all times well lubricated. Surplus oil will flow downwardly through the holes as they pass through their lower position and will be returned to the sump 41.

When the screw 16 shifts the piston outwardly for discharge of clay from the gun, clay particles may fall downwardly from the cylinder wall or may escape between the piston and the cylinder wall and might lodge on the screw 16 and be carried between the screw and the nut when the screw is retracted, and abrade the bearing surfaces. I, therefore, preferably provide a protecting covering for the screw preferably in the form of a helical spring 50 surrounded by a sleeve 51 of suitable flexible material such as buckskin. The spring and sleeve are secured at one end to the frame 12 and at their other end are secured to the piston. When the piston is at its inner end, the flexible sleeve will fold in between the spring turns and when the screw is shifted outwardly with the piston, the spring is expanded and the sleeve extended to form an enclosure around the screw to protect it from clay particles. Clay, dirt, or other foreign matter is therefore prevented from entering between the bearing surfaces of the screw and the nut so that abrasion will be eliminated and the oil will be kept clean.

I have shown outer and inner filling holes 52 and 53 closable by cover structures 54 and 55, through which openings clay is charged into the cylinder. A limit switch 56 driven by gearing 57 from and in synchronism with the motor 39 is provided for automatically controlling the circuit to stop the motor when the piston reaches the ends of its travel in the cylinder.

My improved lubricating arrangement is simple and efficient, and together with the protector 51 for the screw 16, assures that no abrasion producing particles can reach the bearing surfaces of the screw and the nut, and the lubricating oil will be kept clean.

As changes and modifications may be made, I do not desire to be limited to the exact details of structure and arrangement except as specified in the appended claims.

I claim as follows:

1. In a clay gun, the combination of a cylinder, a piston, a screw secured to the piston and prevented from rotational movement, a gear housing surrounding said screw, a nut within said housing engaging said screw, a gear connected with said nut, said housing forming an oil sump from which oil is carried upwardly by said gear, there being oil ducts through said nut for receiving oil flowing down from said gear and for distributing the oil to the bearing surfaces of said screw and nut, turning of said screw causing axial movement of said screw to shift the piston in said cylinder.

2. In a clay gun, the combination of a cylinder, a piston therefor, a head for said cylinder forming a gear housing, a screw extending through said housing and secured to said piston, means for preventing rotational movement of said screw, a nut within said housing having threaded engagement with said screw, a gear secured to said nut, ball bearing structures at the ends of said housing for said screw, a motor and a driving train between said motor and said gear, said housing forming an oil sump from which oil is carried upwardly by said gear to flow back from the top thereof, there being clearance spaces between said bearing structures and said housing and between said bearing structures and said gear, and said screw having oil ducts communicating with said spaces whereby oil flowing from said gear to said spaces will be delivered through said ducts to lubricate the bearing surfaces of said screw and nut.

3. In a clay gun, the combination of a cylinder, a piston therefor, a housing for said cylinder forming a gear casing, a screw extending through said housing and connected with said piston, means preventing rotational movement of said screw, a driving nut for said screw within said housing, ball bearing supports at the ends of said housing for said nut, a gear within said housing secured to said nut between said ball bearing structures, a driving motor and a driving train therebetween and said gear for causing rotation of said gear and nut and axial movement of said screw to shift the piston in said cylinder, said gear casing forming an oil sump from which oil is carried upwardly by said gear to flow downwardly from the top thereof, said nut having a plurality of oil ducts therethrough spaced circumferentially and longitudinally thereon for receiving the oil flowing down from said gear and distributing it to the bearing surfaces of said nut and screw.

4. In a clay gun, the combination of a cylinder, a piston therefor, a housing for said cylinder forming a gear casing, a screw extending through said housing and connected with said piston, means preventing rotational movement of said screw, a driving nut for said screw within said housing, ball bearing supports at the ends of said housing for said nut, a gear within said housing secured to said nut between said ball bearing structures, a driving motor and a driving train therebetween and said gear for causing rotation of said gear and nut and axial movement of said screw to shift the piston in said cylinder, said gear casing forming an oil sump from which oil is carried upwardly by said gear to flow downwardly from the top thereof, said nut having a plurality of oil ducts therethrough spaced circumferentially and longitudinally thereon for receiving the oil flowing down from said gear and distributing it to the bearing surfaces of said nut and screw, and a flexible covering for said screw secured to said gear casing and said piston and being expansible and collapsible to follow the movement of said piston and serving to protect said screw against lodgement thereon of clay particles or other foreign matter.

5. In a clay gun, the combination of a cylinder, a piston therefor, a cylinder head, a piston rod extending from said piston, driving means for shifting said rod to reciprocate said piston in said cylinder, and a tubular foldable sleeve secured to said piston and head and serving as a covering for said piston rod to prevent lodgement of clay or other foreign matter thereon during operation of the gun.

6. In a clay gun, the combination of a cylinder, a piston therefor, a cylinder head, a piston rod extending from said piston through said head, driving means in said head for said rod for causing axial movement of said rod to shift the piston in said cylinder, a helical spring within said cylinder between said piston and said head, and a flexible sleeve surrounding said spring and secured to said piston and head and serving as a covering for said piston rod to prevent lodgement of clay or other foreign matter thereon during operation of the gun.

In testimony whereof I have hereunto subscribed my name at Gary, Lake county, Indiana.

AUGUST F. GIESE, Jr.